United States Patent [19]

Finnern

[11] Patent Number: 5,031,327
[45] Date of Patent: Jul. 16, 1991

[54] APPARATUS FOR FINE ADJUSTMENT OF A SEXTANT

[75] Inventor: Gerd Finnern, Hamburg, Fed. Rep. of Germany

[73] Assignee: C. Plath, Hamburg, Fed. Rep. of Germany

[21] Appl. No.: 301,328

[22] Filed: Jan. 23, 1989

[30] Foreign Application Priority Data

Jan. 20, 1988 [DE] Fed. Rep. of Germany ... 8800635[U]

[51] Int. Cl.⁵ ............................................... G01C 1/02
[52] U.S. Cl. ...................................................... 33/282
[58] Field of Search .................. 33/281, 283–285, 33/290, 292, 816; 356/247

[56] References Cited

U.S. PATENT DOCUMENTS

| 2,439,102 | 4/1948 | Rothweiler | 33/282 X |
| 3,484,942 | 12/1969 | Toubhans | 33/816 |
| 3,698,090 | 10/1972 | Parone | 33/816 |
| 4,656,878 | 4/1987 | Iwai et al. | 33/299 X |

*Primary Examiner*—Harry N. Haroian
*Attorney, Agent, or Firm*—Elliott N. Kramsky

[57] ABSTRACT

A drum screw with measuring drum for fine setting of a sextant includes a coaxial setting ring. The ring, which includes a vernier scale, is rotatable independently of the measuring drum to permit the user to avoid the tiresome zero correction and the need to consider correction factors in calculating location.

5 Claims, 1 Drawing Sheet

APPARATUS FOR FINE ADJUSTMENT OF A SEXTANT

BACKGROUND

1. Field of the Invention

The present invention relates to optical measuring instruments. More particularly, this invention pertains to apparatus for the fine adjustment of a sextant.

2. Description of the Prior Art

In measuring angles by means of a sextant, the alhidade is first roughly adjusted while a drum screw for fine adjustment is disengaged until the object of measurement (e.g. a star) comes approximately into alignment with the line of the horizon. The drum screw is then moved into the limbus toothing and the fine adjustment made by rotating a measuring drum with scale seated on the axis of the drum screw until, for example, the edge of the star reflected into the horizon comes precisely into alignment with the line of the horizon. Before fine-adjustment of the drum screw begins, however, the sextant must be "put down" to determine the zero position on the scale of the measuring drum with engaged drum screw. That is, the user must note (or remember) the degree deviation on the scale of the measuring drum at such moment to be able to carry out a precise positional determination after making the measurement.

SUMMARY AND OBJECTS OF THE INVENTION

It is therefore an object of the present invention to relieve the user of a sextant of the need to perform a tiresome zero correction.

It is another object of the present invention to achieve the preceding object while also relieving the user of the need to consider correction factors in calculating location.

The preceding and other objects are achieved by the present invention that provides a drum screw with measuring drum for the fine setting of a sextant. Such drum screw includes a coaxial setting ring. The ring includes a vernier scale. Means are provided for rotating the ring independently of the measuring drum.

The features of the invention will become further apparent from the detailed description that follows. This description is accompanied by a drawing FIGURE. Numerals of the drawing FIGURE correspond to those of the written description, like numerals referring to like features of the invention throughout.

BRIEF DESCRIPTION OF THE DRAWING

The FIGURE is a side cross-sectional view of the drum screw with measuring drum of a sextant that comprises the invention.

DETAILED DESCRIPTION

Figure 1:
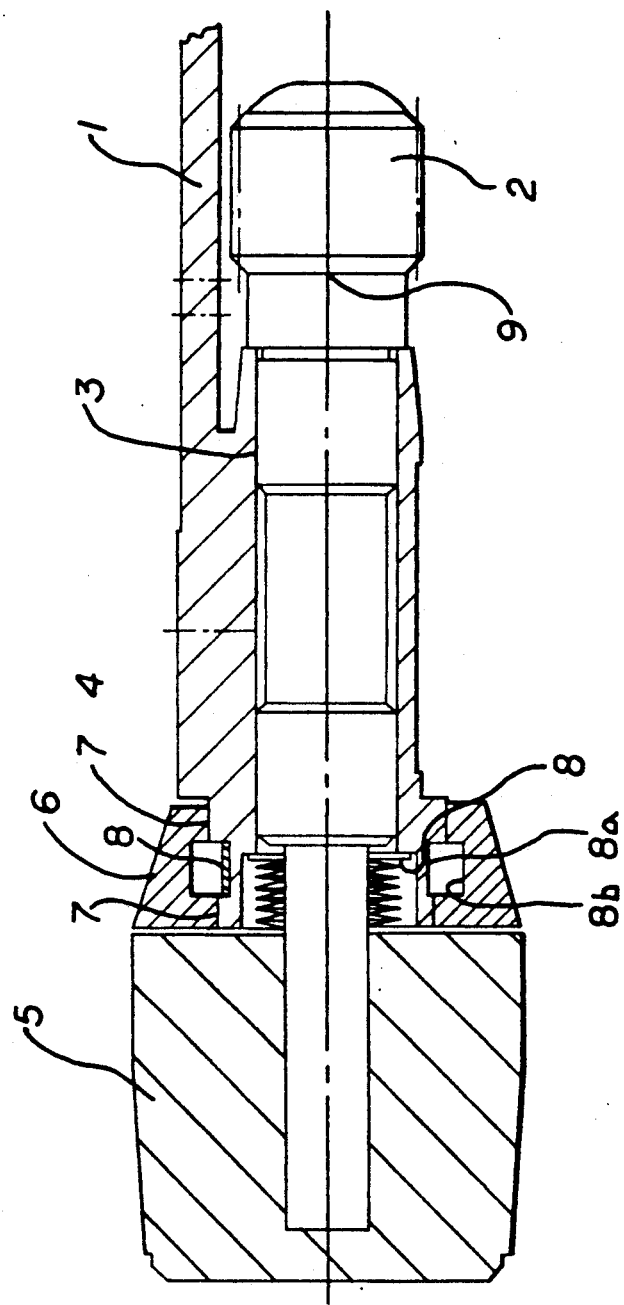

Turning now to the drawings, the FIGURE is a side sectional view of a drum screw 2 with measuring drum of a sextant in accordance with the invention. The drum screw 2 is connected by means of two sliding bearings 3, 4 that are spaced apart on a drum-screw bearing plate 1. The plate 1 is pivotally articulated on the sextant alhidade (not shown). A measuring drum 5 that is provided with an outside scale is seated in a known way on the extended axis 9 of the drum screw 2. A setting ring 6, which is mounted on two coaxial annular shoulders 7 includes an exterior vernier scale (not shown) that permits a zero-point setting before beginning the fine setting of the sextant. The setting ring 6 is conically shaped, the largest diameter of the conical ring matching the outside diameter of the measuring drum 5. The setting ring 6 directly adjoins the measuring drum 5 in the axial direction and is secured against unintentional twisting on the annular shoulder 7 by a rubber clutch liner 8. The conical shape of the setting ring 6 which tapers from the measuring drum 5, combined with the friction clutch 8 ensures that unintentional adjustment of the vernier scale on the setting ring 6 during rotation of the measuring drum 5 does not occur. The friction clutch 8 is, as can be seen, shaped such that no contact can take place in the axial direction with the measuring drum 5 or the drum-screw mounting 3, 4 during adjustment of the setting ring 6.

By providing the drum screw with measuring drum with a vernier scale that is coaxial to the setting ring which can be rotated independently of the measuring drum, operation is significantly facilitated as a consequence of the novel index-correction possibility. Without putting the sextant down, the user can now adjust an infinitely variable vernier scale (instead of the measuring drum) that is set before beginning fine adjustment to the zero point of the measuring-drum scale. The tiresome noting of a zero-point correction is no longer required.

As an advantageous consequence of the invention, unintentional adjustment of the vernier scale is prevented by the conical shape of the setting ring combined with the friction clutch at its interior.

Thus it is seen that the present invention provides apparatus to relieve the user of the need to perform a tiresome zero correction and to consider correction factors in calculating location. While the invention has been described with reference to its presently preferred embodiment, it is not limited thereto. Rather, it is only limited insofar as defined by the following set of claims and includes all equivalents thereof.

What is claimed is:

1. In a sextant of the type that includes a drum screw bearing plate, a drum screw and a measuring drum, said drum screw being displaced from said measuring drum along a common axis, the drum improvement comprising apparatus for the fine setting of said sextant, said apparatus comprising, in combination:
   (a) an annular setting ring, said ring being coaxial with said measuring drum;
   (b) said annular ring including a vernier scale at its outer surface; and
   (c) a friction clutch interposed between said setting ring and said bearing plate and coaxial with said setting ring for permitting rotation of said ring independent of said measuring drum and said bearing plate.

2. A sextant as defined in claim 1 further including:
   (a) said drum-screw bearing plate having two outer annular shoulders; and
   (b) said setting ring is mounted on said annular shoulders and arranged directly adjoining the end of said measuring drum facing said drum screw.

3. A sextant as defined in claim 2 wherein said friction clutch is arranged between said annular shoulders.

4. A sextant as defined in claim 2 wherein said setting ring has a conical outer contour with the greater cone diameter facing said measuring drum.

5. A sextant as defined in claim 4 wherein said friction clutch is arranged between said annular shoulders.

* * * * *